Patented June 12, 1928.

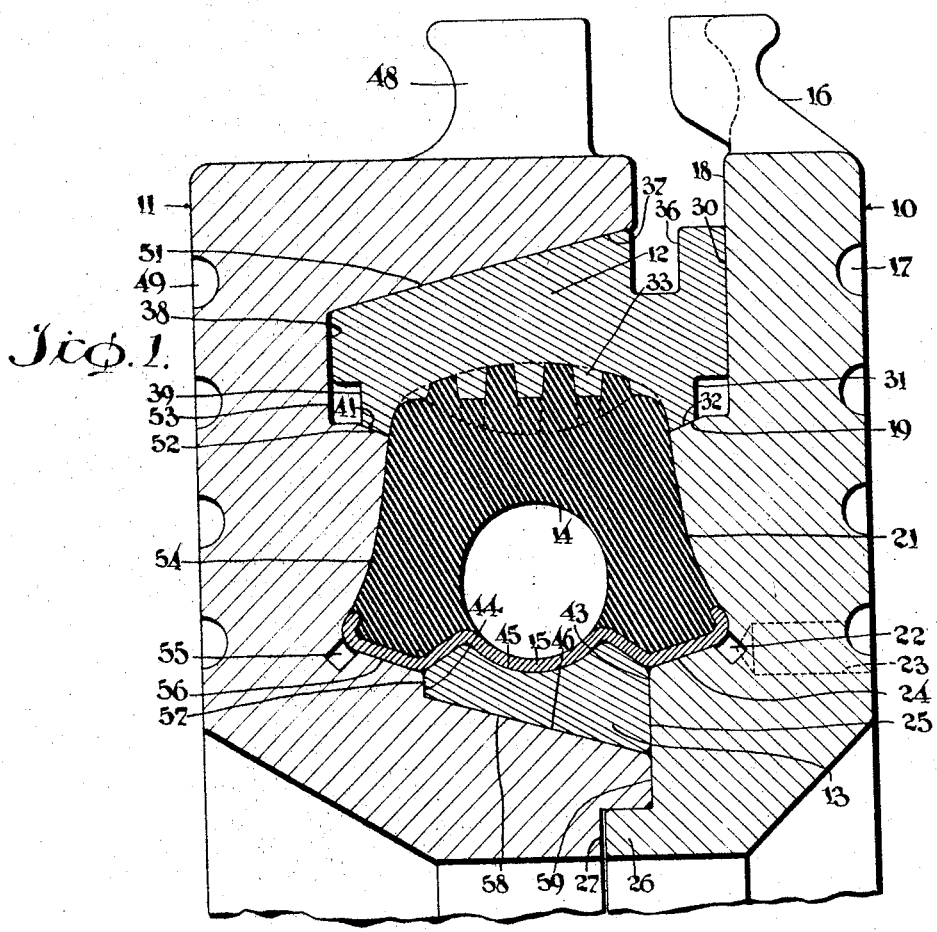
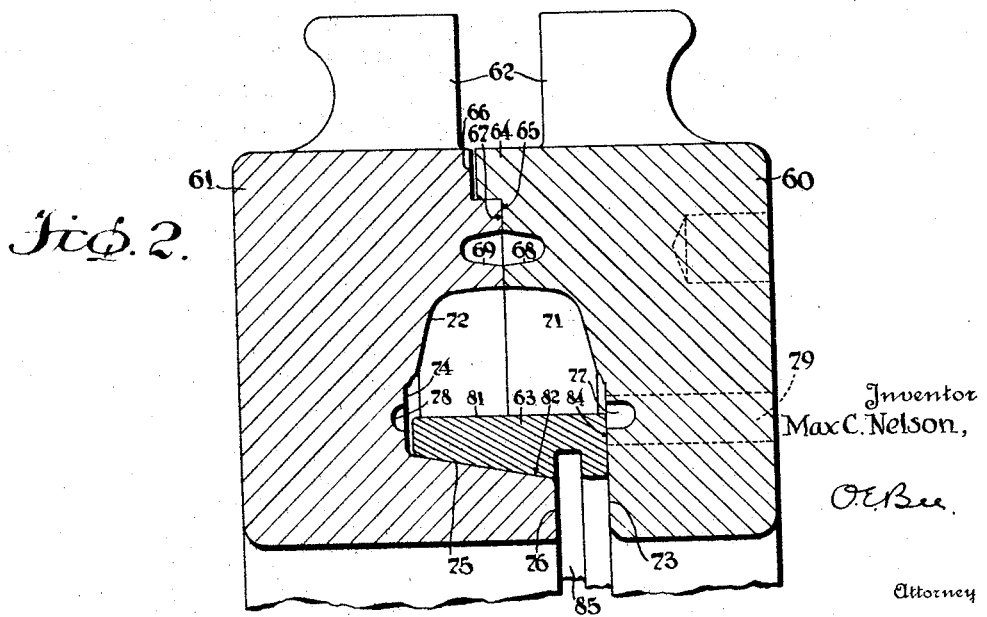

1,673,525

UNITED STATES PATENT OFFICE.

MAX C. NELSON, OF AKRON, OHIO, ASSIGNOR TO THE GOODYEAR TIRE & RUBBER COMPANY, OF AKRON, OHIO, A CORPORATION OF OHIO.

TIRE MOLD.

Application filed December 15, 1925. Serial No. 75,537.

My invention relates to tire molds, and it has particular reference to a mold for a tire having a resilient body portion to which is permanently secured a metallic base band.

Heretofore it has been customary to provide, in a mold of this character, a pair of annular members having cavities formed therein adapted to receive the side walls of the tire, and a plurality of segmental arcuate members adapted to be disposed between the annular members in juxtaposition to the outer and inner peripheries of the tire. The inner segmental members, which support the base band of the tire, have been formed, on their inner peripheries, with two oppositely tapered faces, that engaged tapered recesses formed in each annular member to provide a seat for the base supporting members when the mold was assembled.

A tire is positioned in the mold by disposing one of the annular side wall engaging members in a horizontal plane, lowering the tire into the cavity formed therein, lowering the segmental members until they contact with their bearing seats formed in the annular member, and finally, lowering the other annular member into engagement with all of the aforementioned parts. The continuous annular members and the tire may be handled conveniently by means of a chain hoist, but it is difficult to position the segmental members by the same means, because of their peculiar shape. These members have, accordingly, been lifted above the mold by hand, a difficult operation in view of their weight.

It has been observed that a double tapered base ring tends to become canted within the annular member during assembly of the mold, with the result that a greater pressure is exerted against one portion of the base band of the tire than against the others. The uneven distribution of pressure on the base ring causes an appreciable deformation thereof during vulcanization, and the resulting tire cannot be employed on rims where accurate alignment is required.

The objects of the invention are to provide a mold that will yield a more satisfactory product, through proper alignment of the base supporting members with respect to the tire, and one wherein the segmental members may be positioned without the expenditure of an excessive amount of labor.

In a broad aspect, these objects, together with others incident thereto, are attained by employing a base supporting member having but one tapered face on its inner periphery, as distinguished from the double tapered base rings of the prior art, and in effecting such structural changes in the remaining parts of the mold as will cooperate to produce the desired results.

In the drawings, which illustrate the principles of the invention:

Fig. 1 is a fragmentary cross-sectional view of a mold with a cushion tire having a transversely curved base band positioned therein; and, Fig. 2 is a fragmentary cross-sectional view of a mold adapted to receive a solid tire having a cylindrical base band.

The mold shown in Fig. 1 comprises a pair of annular members or side molding rings 10 and 11, a plurality of segmental arcuate members forming a tread molding ring 12, and a plurality of segmental arcuate members forming a base band supporting ring 13, which are adapted, when properly assembled, to enclose a tire having a rubber cushion body 14 with a metallic base band 15 secured thereto. The side molding ring 10, preferably disposed in a horizontal plane during assembly to receive the cooperating parts, has a plurality of lugs 16 on its outer periphery to which lifting means may be applied, and, on its outer side surface, circumferential grooves or channels 17 that provide passages for steam or other heat conducting fluid circulating around the mold.

The inner surface of the ring 10 is provided with a radially disposed plane face 18, forming a seat for the ring 12, and extending inwardly from the outer periphery to an angularly disposed shoulder 19 that terminates in the face of a cavity 21, adapted to receive the side wall of the cushion body 14 and the flange of the base band 15. A circumferential groove 22 is formed in the lower extremity of the cavity 21 to receive excess rubber, or overflow, from the cushion body 14 of the tire, and it communicates with the exterior of the ring 10 through a passage 23, permitting the escape of steam condensed within the mold.

The receses 22 merges into a tapered ledge 24, serving to support the side portion of the base band 15, contiguous to a radially disposed plane face 25 adapted to form a seat for the base ring 13, and of greater width than the maximum thickness thereof. The plane face 25 terminates in a shoulder 26, interposed therebetween and the inner periphery of the ring 10, adapted to cooperate with a corresponding recess 27 formed on the side molding ring 11 to facilitate the assembly of the parts in registry with each other.

The tread molding ring 12, preferably made into a plurality of arcuate segments for convenience in assembly, is provided with a plane side wall 30, adapted to bear against the seat 18 formed on the molding ring 10, and has a reduced portion 31, for the purpose of providing a recess for the reception of overflow from the tread portion of the tire, that merges into a tapered face 32, adapted to be juxtaposed to the tapered shoulder 19 on the ring 10. The inner periphery of the ring 12 has a series of protuberances and indentations 33 adapted to be impressed into the tread surface of the cushion body 14 of the tire to form a suitable design thereon. The outer periphery of the ring 12 is provided with a recess 36, for the reception of a crowbar, or other suitable tool, by means of which the mold may be disassembled, and with a conical face 37 adapted to coact with a tapered recess formed in the mold ring 11 in a manner which will be explained in detail presently. The side oppositely disposed to the face 30 is provided with a plane radially disposed face 38, reduced portion 39, and tapered face 41, which cooperate with the side molding ring 11 for substantially the same purposes as those ascribed to the similar parts 30, 31 and 32.

The base supporting ring 13, which has a substantially frusto-conical shape, may be formed as a continuous member which is subsequently severed at a single place, although when designed to support a base band having an undulatory cross-section, the ring preferably is divided into a plurality of arcuate segments. The wider side of the ring is formed with a plane radially disposed face 43, adapted to bear against the seat 25 formed on the side molding ring 10, while the oppositely disposed face 44 is provided primarily as an incident to a durable construction that occupies a minimum space. The outer periphery 45 of the ring 13 is curved to register with the undulations of the base band 15 of the tire, it being understood if the base band be cylindrical, that the periphery 45 will be formed likewise, in order to provide contact at all points. The inner periphery 46 of the ring is tapered, and is adapted to coact with a sloping recess formed in the side molding ring 11, as described in detail hereinafter.

The side molding ring 11 has lifting lugs 48 on its outer periphery and circumferential grooves 49 on its outer surface that respectively provide a means for attaching a chain hoist and for the circulation of steam. The inner surface, suitably recessed to enclose snugly the rings 12 and 13 and the tire when they are assembled on the ring 10, is provided, adjacent the outer periphery, with a conical face 51 and a tapered face 52, adapted to coact with the faces 37 and 41 on the ring 12 and a plane radially disposed face 53, adapted to approach the face 38 formed on the ring 12, but dimensioned to provide a slight clearance in order to prevent binding of the parts.

The central portion of the ring 11 is formed with a cavity 54, having a surface adapted to contact with the side wall of the tire, terminating in an overflow groove 55, similar to the groove 22, contiguous to a tapered ledge 56, providing a support for the outer portion of the base band 15. The ledge 56 terminates in a plane radially disposed face 57 that closely approaches the narrow side of the base ring 13 and, in turn, ends in a tapered face 58 that bears against the conical face 46. A projecting portion 59, interposed between the face 58 and the registry recess 27, is made sufficiently wide to fit snugly within the space between the face 46 and the shoulder 26 to cooperate with the adjacent parts to force the ring 13 against the base band 15 when the mold and tire are assembled.

In operation, the ring 10 is disposed in a horizontal plane in a vulcanizing apparatus, with the segments of the ring 12 positioned in distended relation on the seat 18, and with the segments of the ring 13 positioned on the seat 25 adjacent the shoulder 26. The tire is then placed within the cavity of the ring, being guided into proper position through the initial contact of the base band 15 which the tapered ledge 24, which also provides a seat therefor when the tire has reached its lowermost position. The segments of the rings 12 and 13 are then pushed along the seats 18 and 25 until they contact with the tread portion and base band of the tire, and the ring 11 is lowered to close the mold, the tapered faces 51 and 58 contacting with the faces 37 and 46, and thus wedging the segments firmly against the tire. Accurate alignment of the base ring with the base band 15 is attained by employing a base ring having a continuous tapered face, inasmuch as with this construction, the base ring is aligned radially with the rim portion of the tire prior to final closure of the mold.

The tire is removed from the mold after vulcanization by applying lifting means to the ring 11 and at the same time forcing the face 59 thereof from the ring 12 by applying pressure to a crowbar inserted in the recess 36. The segments of the tread and base ring may then be pulled away from the tire in a radial direction and the tire lifted out of the ring 10.

The mold shown in Fig. 2 comprises a pair of annular members 60 and 61 having lifting lugs 62 disposed on their outer peripheries and a base band supporting ring 63. The outer portion of the ring 60 is provided with a lip 64 and a depressed portion 65 adapted respectively to engage with a corresponding recess 66 and flange 67 formed on the ring 61 for the purpose of maintaining the rings in registry. Both rings are provided with circumferential grooves 68 and 69, adapted to align with each other to provide a cavity for the reception of overflow from the tread portion of the tire, and adjacent thereto, similarly formed cavities 71 and 72 are adapted to contact with either half of the surface of the cushion body. The surface of the cavity 71 merges into a plane radially disposed face 73 which extends to the inner periphery of the ring 60 and provides a seat for the frusto-conical base ring 63. The ring 61 is also provided with a radially disposed face 74 that terminates in a tapered face 75 adapted to bear against the inner periphery of the base band 63, and with a radially disposed face 76 extending to the inner periphery of the ring and providing a bearing face for a lifting bar employed to facilitate disassembly of the mold. Overflow cavities 77 and 78, one of which is in communication with the exterior of the mold through a vent 79, are provided adjacent the rim engaging portions of the cavities 71 and 72.

The frusto-conical base supporting ring 63 is provided with a smooth outer periphery 81, adapted to contact at all points with the cylindrical base band of the tire. A tapered inner periphery 82 is adapted to engage the face 75 of the ring 61, and a plane radially disposed wider face 84 bears against the seat 73 on the ring 60. The lower portion of the inner periphery of the ring is provided with a circumferential channel 85 in alignment with the face 76 of the ring 61 for the reception of the end of the tool employed for disassembling the mold. The ring 61 may be separated into a number of segments, although when it is used for a tire having a smooth tread and a cylindrical base band, it is preferred to cut it transversely at one point only.

The mold is employed in substantially the same manner as that shown in Fig. 1. The tire is lowered into the ring 60 which is disposed in a horizontal plane, the base ring, resting upon the seat 73, is then expanded in a radial direction to contact with the tire, and the mold ring 61 is lowered to engage the parts. Accurate alignment, uniform distribution of pressure, and ease in assembly are obtained by employing a lower side molding ring having a radially disposed face providing a seat for the base ring and by forming the latter with a continuous tapered face.

While but two embodiments of the invention have been described in detail, one for a mold for a tire having an indentured tread portion and undulatory base band, and the other a mold for a tire having an uninterrupted tread and cylindrical base band, those skilled in the art will be enabled from the descriptions thereof to effect various changes deemed necessary for their particular purpose and at the same time embody the novel principles described herein. It is intended, therefore, that only such limitations should be imposed upon the invention as are set forth in the following claims.

What I claim is:

1. A rubber tire mold comprising a pair of annular members provided with cavities adapted to receive the cushion body of the tire and a frusto-conical base supporting ring adapted to be assembled between the annular members and against the inner periphery of the tire.

2. A rubber tire mold comprising a pair of annular members provided with cavities adapted to engage the side walls of the tire, one of the members being provided with a radially disposed face extending from the cavity to adjacent the inner periphery of the member, the other member being provided with a tapered face adjacent its inner periphery, and a frusto-conical base supporting member adapted to be assembled between the annular members and to contact with the radially disposed and tapered faces.

3. A mold for a rubber tire having a base band comprising a pair of annular molding rings provided with cavities adapted to engage the side walls of the tire and a base supporting member adapted to bear against the base band of the tire and to be positioned upon one of the molding rings in contact with one surface only thereof.

4. A mold for a rubber tire having a base band comprising a pair of annular members provided with cavities for the side walls of the tire, one of the members being provided with a plane face, and a base supporting member adapted to bear against the base band of the tire and to be positioned upon the plane face only of the annular member.

5. A mold for a rubber tire having a base band comprising a pair of molding rings adapted to engage the side walls of the tire, a base supporting member provided with a continuous tapered face on its inner periphery adapted to be positioned against the base band, one of the molding rings being provided with a tapered face adapted to engage the tapered face of the base supporting member, and the other of the molding rings being provided with a continuous seat for the base supporting member having a width substantially equal to the maximum thickness of the supporting member.

6. A mold for a rubber tire having a base band comprising a pair of molding rings adapted to engage the side walls of the tire, a base supporting member adapted to be positioned against the base band of the tire having a maximum width adjacent one side thereof, and a seat on one of the molding rings adapted to receive the base supporting member and to contact with the wider face only thereof when the mold is assembled.

7. A mold for a rubber tire having a base band comprising molding rings adapted to engage the side walls and tread portion of the tire, a tire contacting member adapted to be positioned against the base band of the tire having one tapered face and one face substantially perpendicular to the axis of the tire, one of the molding rings being provided with a tapered face adapted to engage the tapered face of the tire enclosing member and to position the same when the mold is assembled, and another of the molding rings being provided with a plane face of greater width than the perpendicular face of the base supporting member and forming a seat therefor.

8. A mold for a rubber tire having a base band comprising a plurality of molding rings adapted to engage the side walls and tread surface of the tire, a base supporting member adapted to be positioned against the base band of the tire having one face disposed in a plane substantially perpendicular to the axis of the tire, a seat for the base supporting member on one of the molding rings disposed in a plane substantially perpendicular to the axis of the tire and a seat on another of the molding rings disposed at an angle to the axis of the tire, the width of the perpendicular seat being greater than the maximum thickness of the base band supporting member.

9. A mold for a rubber tire having a base band comprising a pair of molding rings adapted to engage the side walls of the tire and a base supporting member adapted to be positioned against the base band of the tire and the molding rings, the base supporting member having a maximum thickness adjacent one side thereof, a seat on one of the molding rings substantially perpendicular to the axis of the tire adapted to contact with the wider side of the base supporting member only and being of greater width than the maximum thickness of the base supporting member.

10. A mold for a rubber tire having a base band comprising a plurality of molding rings adapted to enclose the cushion body of the tire, a base supporting member adapted to be positioned against the base band of the tire, one of the molding rings being provided with a surface substantially perpendicular to the axis of the tire adapted to form a seat for the base supporting member, the molding ring and base supporting member contacting along the perpendicular surface only when the mold is assembled.

11. A mold for a rubber tire having a base band comprising a plurality of molding rings adapted to engage the cushion body of the tire, one of the molding rings being provided with a tapered face and another of the molding rings being provided with a face substantially perpendicular to the axis of the tire, a base band engaging member provided with a tapered face having substantially the same width as that of the tapered face on one of the molding rings, and adapted to contact therewith, and a face adapted to engage with the perpendicular face on the other mold member having a width substantially equal to the maximum width of the base band engaging member.

12. A mold for a tire having a rubber body and a base band secured thereto comprising a pair of molding rings adapted to engage the side walls of the tire and a base band engaging member adapted to contact with the molding rings respectively through a tapered face opposed to the base band engaging surface and a face at right angles to the axis of the tire having a width greater than the thickness of the base band engaging member at its radial midsection.

13. A mold for a tire having a rubber body portion and a base band secured thereto comprising a pair of annular molding rings each provided with a cavity adapted to engage the side wall of the tire, one of the rings being provided with a tapered recess extending from the side of the ring substantially to the side wall cavity, the other ring being provided with a radial face extending from the side wall cavity to substantially the inner periphery of the ring, a segmental base band engaging ring having a tapered face on the inner periphery thereof adapted to register with the tapered face of one molding ring and a radial face of greater width than the thickness of the radial mid-section of the ring adapted to bear against the radial face of the other ring.

14. A mold for a tire having a rubber cushion body and a peripherally indented base band secured thereto comprising annular members adapted to engage the side walls and the tread portion of the tire, one of the annular members having a tapered recess adjacent the inner periphery thereof, another of the annular members having a continuous face disposed in a radial plane adjacent the inner periphery thereof, a segmental base band engaging ring having an indented outer periphery adapted to contact with the base band of the tire, a tapered face oppositely disposed thereto adapted to bear against the tapered recess of one annular member, and a radially disposed face at one side of the ring of greater width than the mid-section of the ring adapted to contact with the radially disposed face of the other annular member.

15. A mold for a tire having a resilient body portion and a base band of arcuate cross-section secured thereto comprising a pair of annular members, one of which is provided with a cavity for the side wall of the tire and tapered recesses at either side thereof, the other of which is provided with a cavity for the opposite side wall and with radially disposed plane faces contiguous therewith and extending substantially to the outer and inner peripheries of the member, a plurality of tread molding rings adapted to be positioned between the tread of the tire and one cavity and one radial face on either annular member, and a segmental base band engaging ring adapted to be positioned between the tapered recess and radially disposed face on either annular member adjacent the base band of the tire.

In witness whereof, I have hereunto signed my name.

MAX C. NELSON.